United States Patent [19]

Nalbant

[11] Patent Number: 5,615,093
[45] Date of Patent: Mar. 25, 1997

[54] CURRENT SYNCHRONOUS ZERO VOLTAGE SWITCHING RESONANT TOPOLOGY

[75] Inventor: Mehmet K. Nalbant, Garden Grove, Calif.

[73] Assignee: Linfinity Microelectronics, Garden Grove, Calif.

[21] Appl. No.: 286,359

[22] Filed: Aug. 5, 1994

[51] Int. Cl.⁶ .................................................. H02M 3/335
[52] U.S. Cl. .......................... 363/25; 323/235; 315/307
[58] Field of Search ........................ 363/23, 25; 323/235, 323/236; 315/308, 307, DIG. 7

[56] References Cited

U.S. PATENT DOCUMENTS

| | | | |
|---|---|---|---|
| 3,916,283 | 10/1975 | Burrows | 321/2 |
| 4,307,441 | 12/1981 | Bello | 363/25 |
| 5,475,285 | 12/1995 | Konopka | 315/224 |
| 5,479,337 | 12/1995 | Voigt | 363/131 |

OTHER PUBLICATIONS

IEEE Publication, "Dual Switched Mode Piower Converter"; Pallab Midya & Fred H. Schlereth; p. 155 1989.
Int. J. Electronics, "New soft-switching inverter for high efficiency electronic ballast with simple structure" E.C. Nho, et al., 1991, vol. 71, No. 3, 529–541.

Primary Examiner—Peter S. Wong
Assistant Examiner—Shawn Riley
Attorney, Agent, or Firm—Loeb & Loeb

[57] ABSTRACT

A power converter circuit provides low conversion losses, low generated noise and output power controllability. The circuit includes a controller, at least two transistors and an output network that provides impedance matching and operating point stabilization functions. The output network also enables zero voltage switching of the transistors, thus reducing radiated noise and minimizing (and possibly eliminating almost completely) switching losses. The controller circuitry includes an oscillator which is capable of self synchronizing to the resonant frequency of the components of the output network. Power modulation (e.g., for dimming of a lamp) is accomplished simply by desynchronizing and increasing the oscillator frequency. Thus, the control architecture allows the use of external parts of lower precision and cost while providing dimming capability in a single stage.

25 Claims, 15 Drawing Sheets

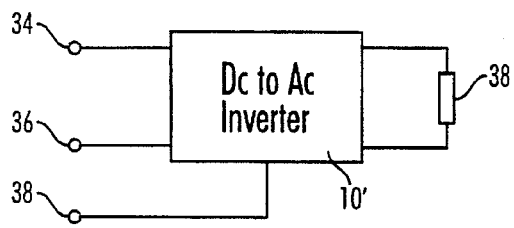
FIG. 2a
PRIOR ART
FIG. 2b
PRIOR ART
FIG. 2c
PRIOR ART
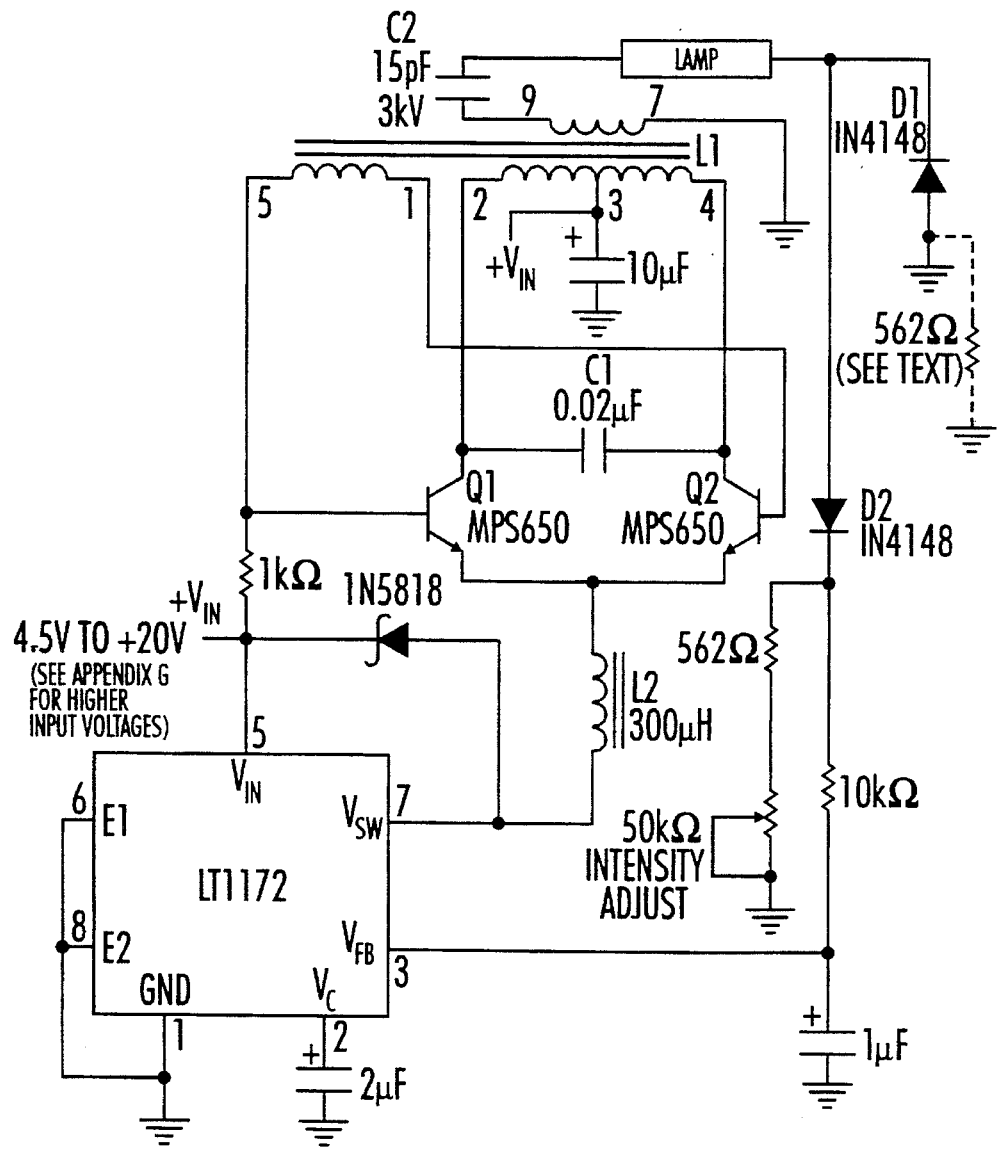
FIG. 3
PRIOR ART

CURRENT SYNCHRONOUS ZERO VOLTAGE SWITCHING RESONANT TOPOLOGY

BACKGROUND OF THE INVENTION

1. Field of the Invention

The present invention relates generally to a power converter circuit and, in particular embodiments, a power conversion circuit topology that can provide low conversion losses, low generated noise and output power controllability.

2. Related Art

Power converter circuits according to embodiments of the present invention are described below. As discussed below, one preferred application of use of a power converter circuit is for starting and controlling one or more cold cathode fluorescent lamps (CCFLs). Such lamps require a high starting voltage (in the order of 700–1000 volts) for a short period of time to ionize the gas contained within the lamp tubes and fire or ignite the lamp. After the gas in a CCFL is ionized and, thus, the lamp is fired, less voltage is needed to keep the lamp on.

CCFL tubes typically contain a gas, such as Argon, Xenon, or the like, along with a small amount of Mercury. After an initial ignition stage and the formation of plasma, current flows through the tube which results in the generation of ultraviolet light. The ultraviolet light in turn strikes a phosphoric material coated in the inner wall of the tube, resulting in visible light.

Typical lamp parameters are as follows:

| Starting Voltage (Vrms) | Operating voltage V (Vrms) | Operating Current I (mArms) | Maximum Current (mArms) |
| --- | --- | --- | --- |
| 750 | 340 | 5 | 20 |

Therefore, devices intended to ignite or start up such a tube must be able to generate the starting voltage and be able to supply the operating current at the nominal voltage. A simplification of the process may be obtained by assuming equivalent operating point impedances. Based on this assumption, the approximate impedance of the tube at the operating point is:

$$R_{tube} = \frac{V_{op}}{I_{op}}$$

For example, using the above-noted values for typical lamp parameters, the impedance of the tube above is:

$$R_{tube} = \frac{340 \text{ V}}{5 \text{ mA}} = 68 \text{ K}\Omega$$

The terminal electrical characteristics of the tubes are highly nonlinear. As discussed above, the tubes require a relatively high voltage to start conducting current. Therefore, until start up, their impedance is very high and the current conduction is negligible. Once ignited however, they exhibit a negative resistance which can make them unstable under some conditions resulting in oscillation. In this regard, a high impedance drive is desirable for a stable operation.

Prior methods of powering CCFLs typically included a ROYER oscillator with an appropriate high voltage transformer. In some cases, when dimming is a requirement, a preregulating buck regulator stage is also included. However, buck regulator waveforms are generated by hard switching, which can result in switching losses and switching noise. In other prior systems, dimming functions are provided by gating the ROYER oscillator on and off to modulate the amount of light emanating from the CCFLs.

FIG. 1 shows a basic ROYER oscillator 10, connected for powering CCFLs 12 and 14. The oscillator 10 has a DC power input 16 coupled to the center terminal of the primary coil of a transformer 18. A primary capacitor 24 is coupled in parallel with the primary coil of transformer 18. One end of the primary coil is coupled to the collector of a first bipolar transistors 20. The other end of the primary coil is coupled to the collector of a second bipolar transistor 22. The emitters of both transistors 20 and 22 are coupled to ground. The collector of transistor 20 is further coupled to the base of transistor 22 through a resistor 26 and the collector of transistor 22 is further coupled to the base of transistor 20 through a resistor 28. In FIG. 1, the pair of parallel coupled CCFLs 12 and 14 are coupled across the secondary coil of transformer 18. Capacitors 30 and 32 represent ballasting capacitors of the CCFLs 12 and 14, respectively. The circuit provides an alternating current power signal to the lamps 12 and 14.

The power conversion function of the circuit shown in FIG. 1 can be relatively inefficient. For example, if a preceding stage (such as a buck regulator preceding the convertor) is used to control the current (e.g., for providing a dimming function), the efficiency losses of each stage becomes a factor in the overall efficiency of the system. Thus, if the current control stage has an 80% efficiency and the FIG. 1 circuit has an 80% efficiency, the overall efficiency of a both stages combined will be 80% of 80%, or 64%. In addition, the use of bipolar transistors as shown in FIG. 1 can adversely effect the efficiency.

FIG. 2a shows a block representation of a typical ROYER oscillator 10' which is gated on and off for providing dimming functions. The oscillator 10' receives a DC input signal across terminals 34 and 36 and a dimming control signal at input 38. A pulse-width modulated control signal, such as the square wave signal 40 shown in FIG. 2b, is provided as a dimming control signal to input 38. In response, the oscillator 10' provides a pulse-width modulated current signal, such as the current signal 42 shown in FIG. 2c, to a CCFL 38. Although the circuit of FIG. 2a provides a single stage conversion, it typically provides other problems that make it undesirable, such as reduced lamp life and low frequency audible noise.

FIGS. 3 and 4 show other implementations of CCFL drivers with dimming capabilities. However, these drivers employ a double stage conversion. In addition, these circuits employ four power switches, which increases the cost and complexity of the circuits.

Prior power conversion systems have typically displayed several disadvantages. For example, as discussed above, double stage power conversion (with typical efficiencies in the 80% range for each stage) can be relatively inefficient. Additional disadvantages of various prior systems include the use of a hybrid of hard switching, resonant mode double stage power conversion devices, unclamped voltages for the power switches (uncoordinated shutdown of power FETs may cause them to destruct due to the discharge of the buck inductor current), the use of four power switches, the use of a front end buck regulator which operates at a different frequency than the ROYER invertor circuit and which may cause frequency beat, restricted dimming range for stable operation, higher standby currents and limited input voltage and power.

Thus, there is a need in the industry for a power conversion circuit topology that can provide low conversion losses, low generated noise and output power controllability. While the prior art systems described above and embodiments of the invention described below relate to power conversion and control circuits for CCFLs, it will be understood that further embodiments of the invention may be employed for any suitable power conversion need.

SUMMARY OF THE DISCLOSURE

Embodiments of the invention are suitable for starting and powering CCFLs, such as those found in portable computing equipment, various instrumentation and other similar equipment. Further embodiments of the general topology may also have applications in various power conversion equipment such as high frequency switch-mode power supplies.

According to preferred embodiments, a power converter circuit provides low conversion losses, low generated noise and output power controllability. The circuit includes a controller, at least two transistors and an output network that provides impedance matching and operating point stabilization functions. The output network also enables zero voltage switching of the transistors, thus reducing noise generation and minimizing (and possibly eliminating almost completely) switching losses. The controller circuitry includes an oscillator which is capable of self synchronizing (or locking) to the resonant frequency of the components of the output network. Power modulation (e.g., for dimming of a lamp) is accomplished simply by desynchronizing and increasing the oscillator frequency. Thus, the control architecture allows the use of external parts of lower precision and cost while providing dimming capability in a single stage.

In preferred embodiments, the controller is implemented in a convenient IC package which includes an oscillator and a number of FET drivers. A pair of FETs are driven by the controller so as to control an external LCC resonant circuit to provide a sinusoidal voltage signal to a load (such as a CCFL). The controller senses the resonant circuit current and controls the FETs for zero voltage switching. In addition, the sensed resonant circuit current is used to force the IC oscillator frequency to lock to the natural frequency of the LCC resonant circuit.

The lamp current is regulated by sampling and half wave rectifying the current through the load (such as a CCFL) and converting the half wave rectified signal to an average voltage. This average voltage is compared with a reference or control voltage for regulating the lamp current.

BRIEF DESCRIPTION OF THE DRAWINGS

The detailed description of the invention will be made with reference to the accompanying drawings, wherein like numerals designate corresponding parts in the several figures.

FIG. 2a is a schematic block diagram of a conventional prior invertor with a dimming function.

FIG. 2b is a waveform diagram of a pulse-width modulated control signal for the invertor shown in FIG. 2a.

FIG. 2c is a waveform diagram of a pulse-width modulated tube current signal provided by the invertor shown in FIG. 2a.

FIGS. 3 and 4 are schematic diagrams of further conventional prior art invertors which employ buck current pre-regulators, as shown in data books available from Linear Technology Corporation (in San Jose, Calif.) and Unitrade Corp. (in Merrimark, N.H.) respectively.

DETAILED DESCRIPTION OF PREFERRED EMBODIMENT

The following detailed description includes the best presently contemplated mode of carrying out the invention. This description is not to be taken in a limiting sense, but is made merely for the purpose of illustrating the general principles of the invention. The scope of the invention is best defined by the appended claims.

Embodiments of the invention are suitable for powering up cold cathode fluorescent tubes (CCFLs), such as those found in portable computing equipment, various instrumentation and other similar equipment. Further embodiments of the general topology may also have applications in various power conversion equipment such as high frequency switch-mode power supplies.

According to one embodiment of the present invention, an IC is used as a controller in an invertor module powering CCFLs. The CCFLs may be used, for example, as back-lighting for displays, such as flat panel LCD displays of portable computing equipment, vehicle dashboards and control panels or other displays.

Figure 1:
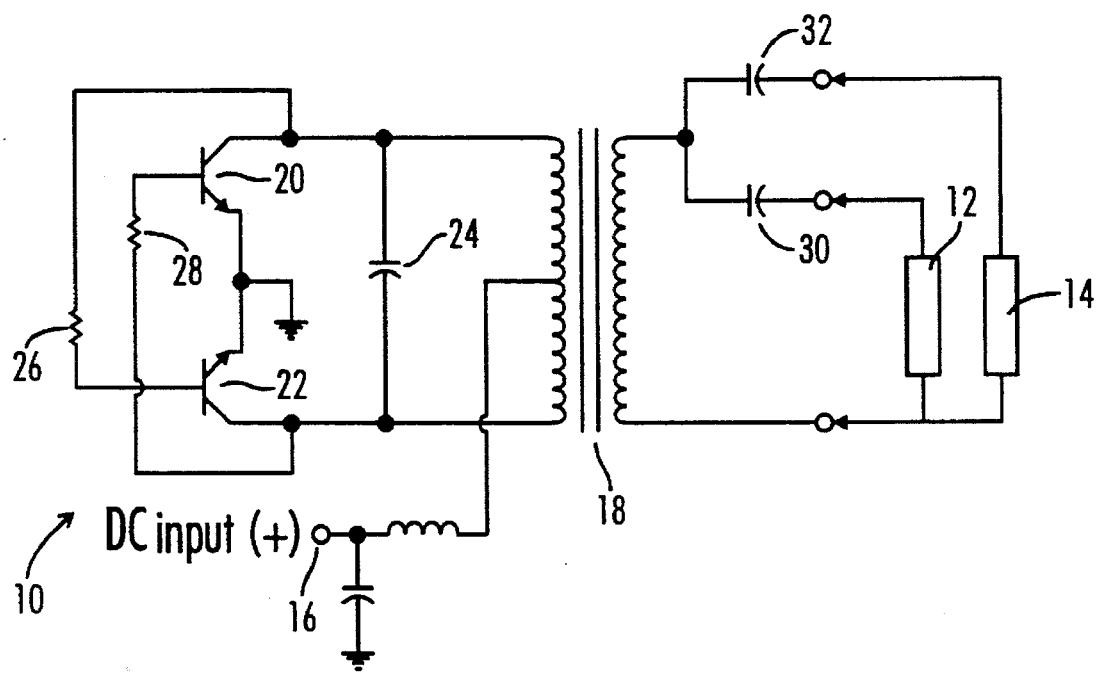
FIG. 1 is a schematic diagram of a conventional prior basic ROYER oscillator.
Figure 4:
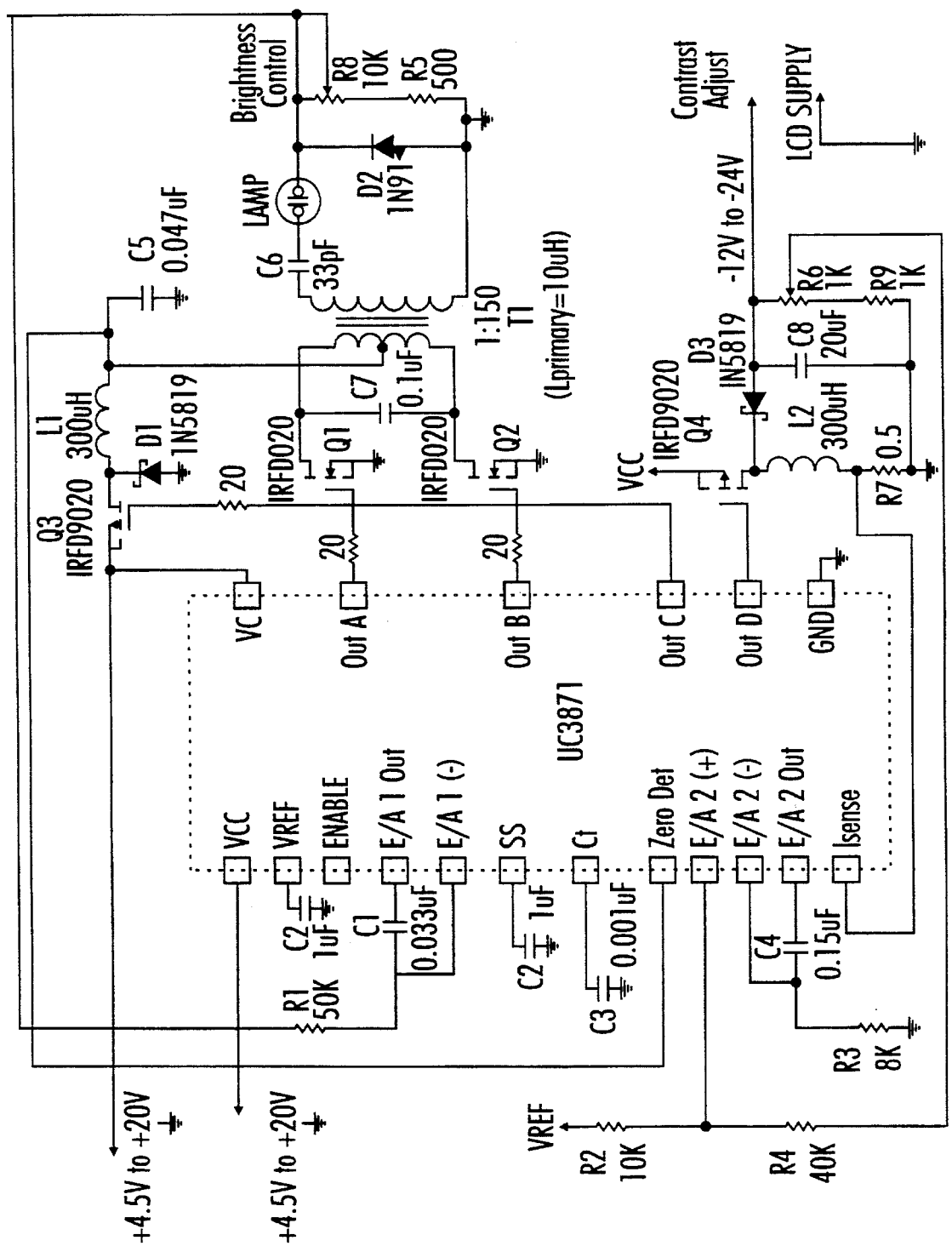
Figure 5:
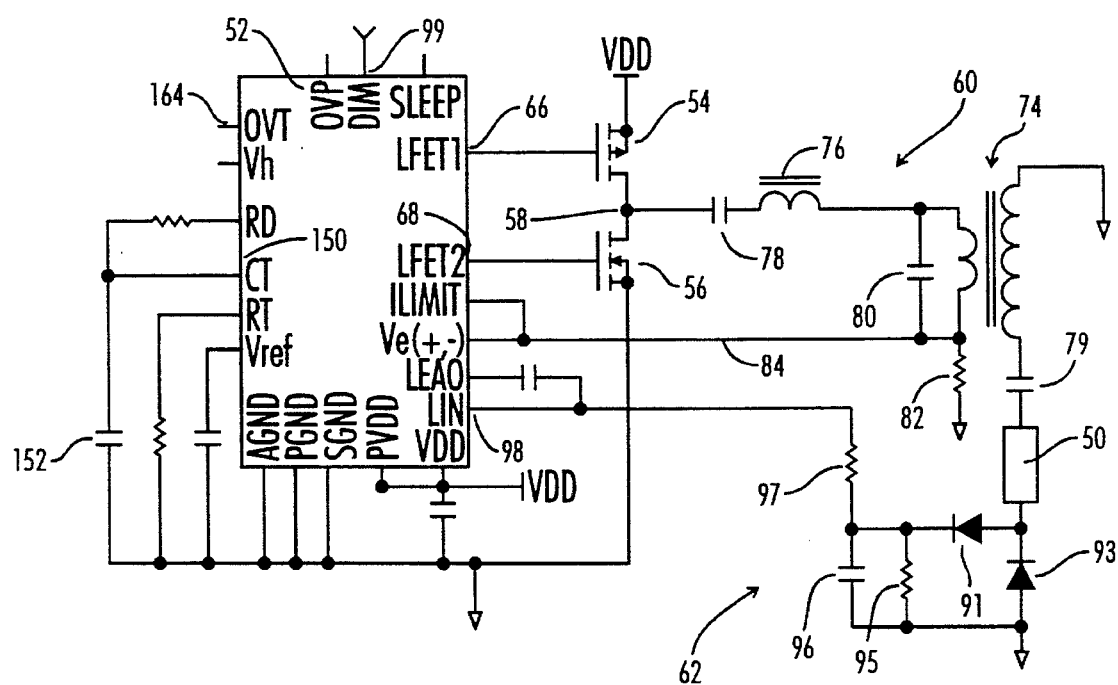
FIG. 5 is a schematic diagram of a power conversion circuit according to an embodiment of the present invention.

A schematic of a half-bridge circuit for a backlight according to an embodiment of the present invention is shown in FIG. 5. The conversion topology used in the backlight circuit is based on a unique "Current Synchronous Zero Voltage Switching" (CS-ZVS) topology. In preferred embodiments, this topology maximizes the tube drive circuit impedance, provides sinewave shaped AC currents and provides a constant current operation at medium operating frequencies of 20 KHz to 50 KHz.

In FIG. 5, a lamp 50 is powered by an electrical circuit comprising an integrated circuit (IC) controller 52, a pair of complementary transistors 54 and 56 coupled at a junction 58, an output network 60 coupled between the junction 58 and the lamp 50 and a feedback circuit 62 coupled between the lamp and the IC controller. In the FIG. 5 embodiment, the transistors 54 and 56 are an N channel FET and a P channel FET, respectively. However, further embodiments may employ other suitable transistor arrangements, such as two P channel FETs or two N channel FETs.

The IC controller is described in more detail below with reference to the schematic diagram of FIG. 8. Referring to FIG. 5, the gates of the FETs 54 and 56 are coupled to the LFET1 and LFET2 pins 66 and 68 of IC controller 52. (As discussed below with reference to FIGS. 9 and 10, further embodiments of an IC controller include additional pins 70 and 72, LFET3 and LFET4, respectively, provided for full bridge configurations.)

The source of FET 54 is coupled to supply voltage VDD and the source of FET 56 is coupled to ground. The FETs 54 and 56 are controlled (toggled) by the IC controller 52 to turn on and off in alternating fashion. In particular, square wave control or drive signals (FIG. 6, signals 55 and 57, respectively) are provided to the gates of FETs 54 and 56 by controller 52. The drive signal 57 is inverted internally within the IC controller before being supplied to FET 56, but is shown uninverted for purposes of clarity.) As a result, a square wave voltage signal is provided at the junction 58.

The square wave signal at junction 58 is provided to the output network 60. The output network 60 includes a transformer 74 having a secondary winding coupled to lamp 50 and a primary winding coupled to a resonant circuit. In the illustrated embodiment, the resonant circuit is an inductor-capacitor-capacitor (LCC) resonant circuit having an inductor 76 and capacitors 78 and 80. The LCC circuit converts the square wave signal to a high frequency sine wave voltage signal. The output network, with a ballasting capacitor 79 on the secondary winding side, thus, forms a high impedance voltage source for driving lamp 50.

Normally, the presence of multiple reactive components creates some fundamental manufacturing problems such as a requirement for fine tuning the oscillator frequency of the control IC and "tight tolerancing" the components involved. The complicated nature of calculating the component values for the matching network represents another design related problem.

According to preferred embodiments of the invention, fine tuning and "tight tolerancing" requirements of the components can be minimized with the use of the current synchronous control implemented in the IC controller 52. In the illustrated embodiment, the transistors are controlled by an oscillator circuit internal in the IC controller 52, in accordance with the resonant frequency of the output circuit 60. In particular, the toggling of the transistors occurs near the zero voltage crossing of a voltage signal (e.g., zero voltage crossing 85 of voltage waveform 83 in FIG. 6) produced across a resistor 82 coupled to sample the resonant current of the output circuit 60. In this manner, the IC controller 52 is capable of controlling the toggling of the transistors 54 and 56 so that each transistor is turned on when there is virtually zero voltage across the transistor.

In the absence of synchronization the IC oscillator is self running at a frequency that can be approximately 20% lower than the resonant frequency of the LCC circuit. However, when the DIM input (discussed below) is at a maximum value (no dimming) at least initially the synchronous detect circuit controls the generation of clock pulses by the IC oscillator to coincide with the resonant frequency of the LCC circuit. When dimming is desired the IC oscillator is controlled to generate clock pulses at a rate higher than the resonant frequency of the LCC circuit. In the illustrated embodiment, the resistor 82 is coupled between one end of the primary winding of transformer 74 and ground. A sensing conductor 84 is coupled to the winding side of resistor 82 and to the resonant signal sense input ($V_{s(\pm)}$) 86 and the peak current limit input (ILIMIT) 88 of the IC controller 52. As discussed in more detail below, the controller 52 senses the output network's resonant current across resistor 82 and forces the IC oscillator frequency to "lock" to the resonant frequency of the network.

In this manner, the operating point frequency becomes self determinant, and tight tolerancing requirements of the output network components are minimized, if not eliminated. Furthermore, as discussed below, dimming of the lamp can be accomplished simply by desynchronizing the IC oscillator frequency with respect to the output network's resonant frequency (e.g., by increasing the IC oscillator frequency).

As noted above, a feedback circuit 62 is coupled between the lamp 50 and the controller 52. The feedback circuit comprises a pair of diodes 91 and 93 coupled to half wave rectify the current flowing through lamp 50. The half wave rectified current signal is converted to an average DC voltage signal with the resistor 95 and capacitor 96. This average voltage signal is provided to the inverting input of a lamp current control amplifier (discussed below) through pin LIN (98 in FIG. 5) of the IC controller 52.

The lamp current is regulated by sensing the voltage across resistor 95 and converting that to an average value for comparison to an internal or external reference. In the illustrated embodiment, the reference is the voltage present on the DIM input pin (99 in FIG. 5) of the IC. The information thus available is used to keep the RMS current constant or within predetermined limits.

Figure 6:
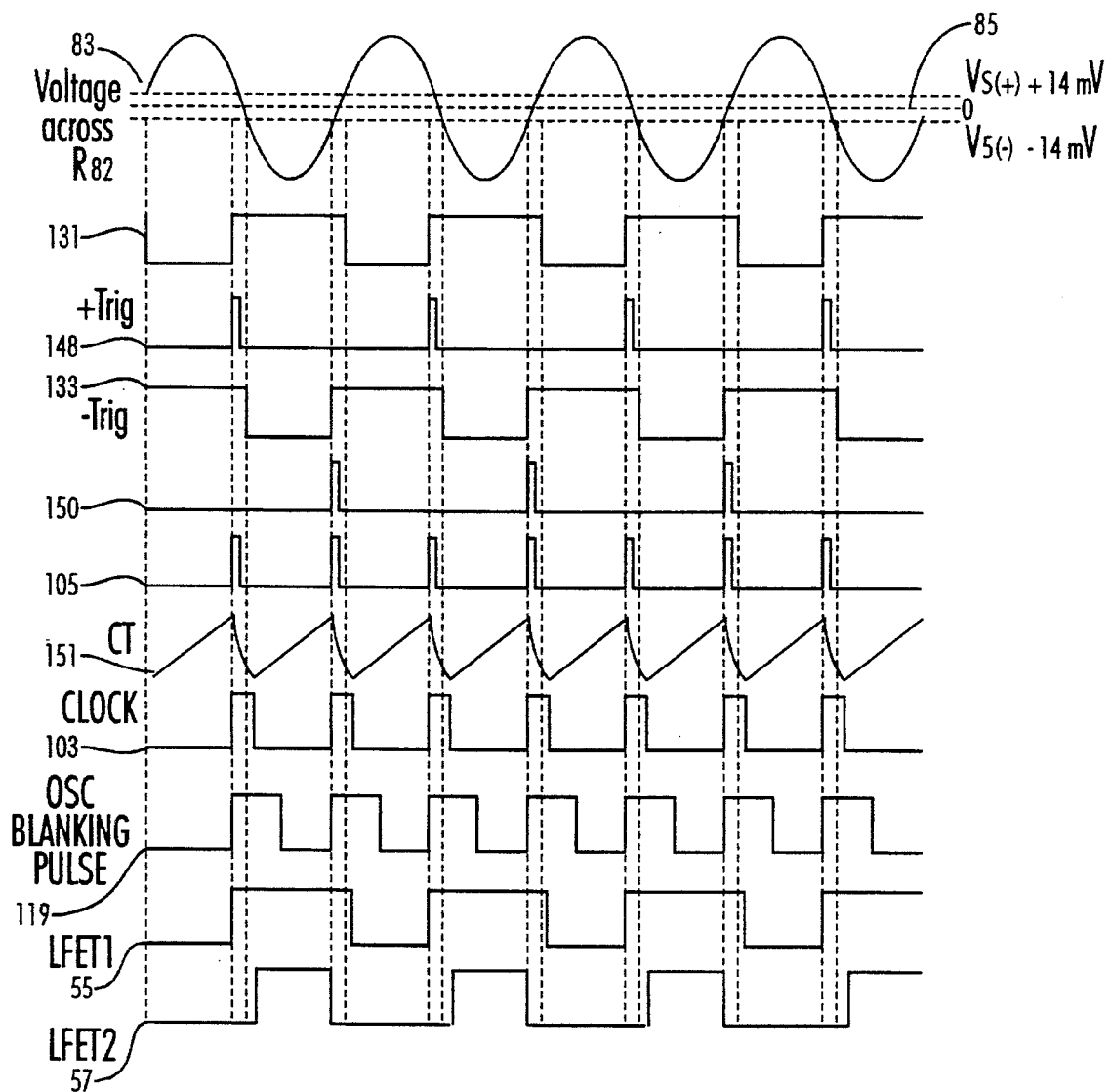
FIG. 6 is a waveform diagram of various signals.
Figure 7:
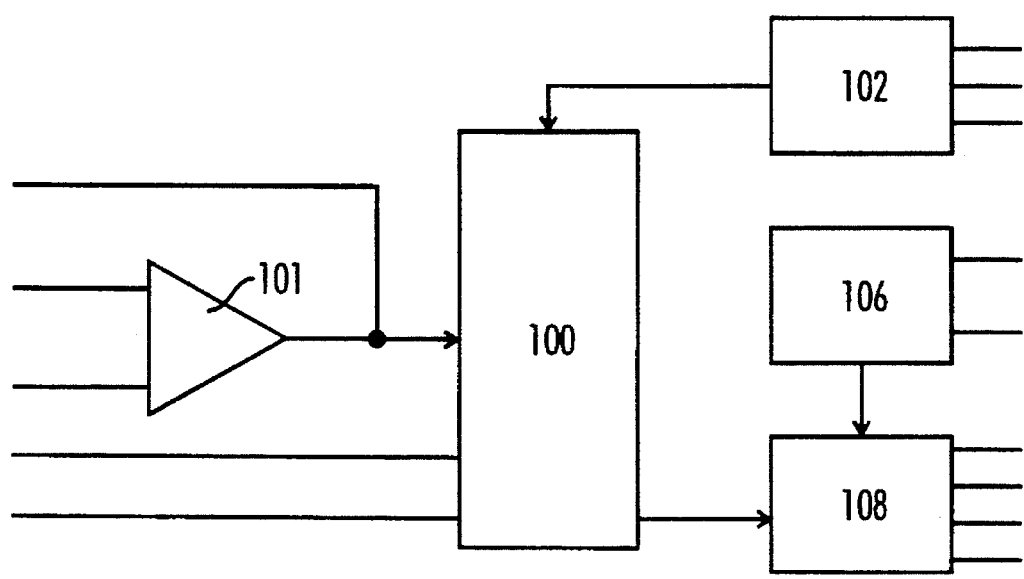
FIG. 7 is a block diagram of an embodiment of the IC controller shown in FIG. 5.
Figure 8:
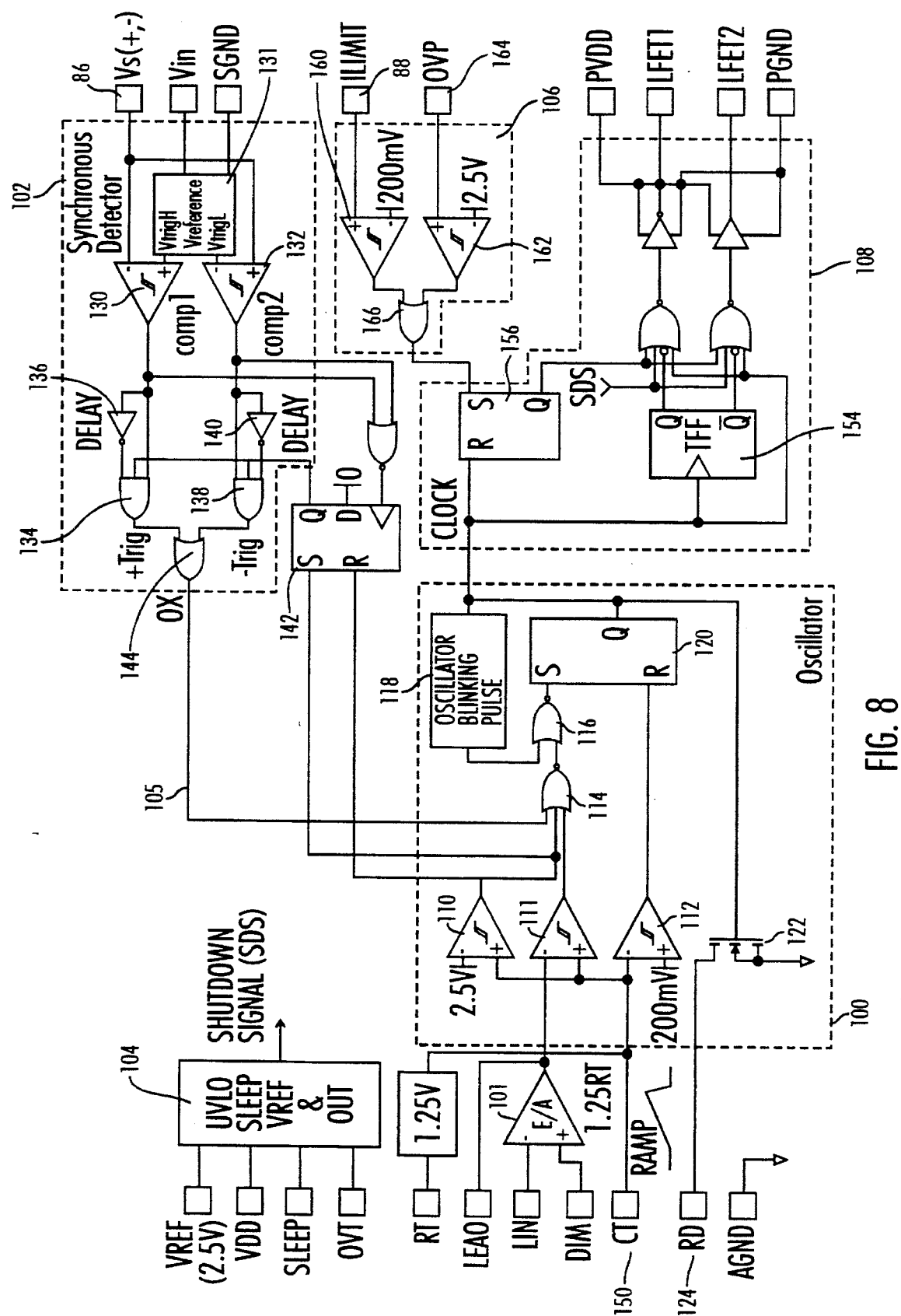
FIG. 8 is schematic circuit diagram of an embodiment of the IC controller shown in FIG. 5.

General principles of embodiments of the invention may be understood with reference to the waveform diagram in FIG. 6, the general block diagram of the IC controller 52 in FIG. 7 and the schematic circuit diagram of the IC controller 52 shown in FIG. 8.

In the block diagram of the IC controller 52 shown in FIG. 7, the controller includes the following general circuit sections: an oscillator 100; a modulator error amplifier circuit 101 (also referred to as the lamp current amplifier); a synchronous detector circuit 102; an under voltage lock out (UVLO), SLEEP and the reference voltage generator circuit 104; a current limit and over voltage protection (OVP) circuit 106; and a steering logic and output driver circuit 108.

In general, the oscillator circuit 100 is coupled to the output driver circuit 108 to provide a clock signal (103 in FIG. 6) to the output driver circuit 108, dependent upon the oscillation frequency of the oscillator circuit 100. The clock signal controls the output driver circuit 108 to provide transistor drive signals (55 and 57 in FIG. 6) to pins 66 and 68. The synchronous detector is coupled to the oscillator circuit 100 to provide a first oscillator control signal (105 in FIG. 6) to the oscillator circuit. The error amplifier circuit 101 provides a second oscillator control signal to the oscillator circuit. As discussed in more detail below, the first and second oscillator control signals control the oscillator frequency, setting the clock signal frequency to control the output driver circuit 108 to provide transistor drive signals to transistors 54 and 56.

It will be understood that various circuit configurations may be employed for practicing the general principles of the present invention. However, an example of preferred circuit configuration for the circuits of IC controller 52 is shown in FIG. 8.

In the FIG. 8 embodiment, the oscillator circuit 100 includes three comparators 110, 111 and 112. The comparator 110 has an inverting input held at a predetermined "high level" voltage (for example 2.5 V) and a noninverting input coupled to the noninverting input of the comparator 111 and the inverting input of the comparator 112. The noninverting input of the comparator 112 is held at a predetermined "low level" voltage (for example, 200 mV). The inverting input of the comparator 111 is coupled to the output of the error amplifier 101. The outputs of the comparators 110 and 111 are coupled to two respective inputs of a NOR gate 114. The third input of the NOR gate 114 is coupled to the synchronous detect circuit 102. A further NOR gate 116 has an input coupled to the output of NOR gate 114 and a second input coupled to an oscillator blanking pulse circuit 118. The output of the NOR gate 116 is coupled to the set "S" input of a flip flop circuit 120. The reset "R" input of the flip flop circuit 120 is coupled to the output of the comparator 112. The gate of transistor switch 122, coupled between a timing capacitor discharge pin 124 (RD) and ground, is coupled to the "Q" output of the flip flop 120 to control the discharging of an external capacitor 152 (FIG. 5).

The synchronous detector circuit 102 shown in FIG. 8 includes two comparators 130 and 132. The inverting input of comparator 130 and the noninverting input of comparator 132 are each coupled to the resonant signal sense input pin ($V_{s(\pm)}$) 86. The noninverting input of comparator 130 and the inverting input of comparator 132 are each coupled to a reference voltage source 131 which provides reference voltages shown as $V_{s(+)}$ and $V_{s(-)}$ in FIG. 6 (for example, +14 mV and −14 mV, respectively). The output of the comparator 130 is coupled to two respective inputs of an AND gate 134 directly and through a delay element 136, respectively. Similarly, the output of the comparator 132 is coupled to two respective inputs of an AND gate 138 directly and through a delay element 140, respectively. A third input of each AND gate 134 and 138 is coupled to the "$\overline{Q}$" output of a flip flop 142. The output of each AND gate 134 and 138 is coupled to the two respective inputs of an OR gate 144.

The synchronous detector 102 provides a first oscillator control signal (105 in FIG. 8) in the form of a pulse wave signal. In particular, a signal representative of the instantaneous voltage across resistor 82 (FIG. 5) is provided to pin 86 and, thus, to the inverting input of comparator 130 and the noninverting input of comparator 132. The output of comparator 130 is high when the voltage signal input (representing the voltage across resistor 82) is less than the reference voltage input (e.g. +14 mV) of the comparator. Similarly, the output of comparator 132 is high when the voltage signal input (representing the voltage across resistor 82) is greater than the reference voltage input (e.g., −14 mV) of the comparator.

By providing the outputs of comparators 130 and 132 to the logic and delay circuits 134, 136, 138 and 140, trigger pulses (+Trig 148 and −Trig 150 in FIG. 6) are provided at the outputs of AND gates 134 and 138, respectively. These trigger pulse signals are combined via OR gate 144 to provide the first oscillator control signal (105 in FIG. 6). In this manner, the first oscillator control signal (105 in FIG. 6) comprises a pulse provided each time the voltage across resistor 82 (FIG. 5) falls to a +Trig voltage level (e.g., 14 mA) or rises to a −Trig voltage level (e.g., −14 mA) with respect to ground. The duration of the pulses is determined by the delay times provided by the delay circuits 136 and 140.

The first oscillator control signal (105 in FIG. 6) is provided to the input of the NOR gate 114 of the oscillator circuit 100 to control the generation of a clock pulse, at least at the start of the operation of the controller 52. Once the output network 60 produces enough power to power the lamp 50, a voltage signal representing the current in network 60 is provided at the pin LIN (98 in FIG. 5) of the IC controller 52, as discussed above. This voltage signal is compared with a reference voltage signal DIM (for example a 2.5 V signal) via the error amplifier 101 (preferably a high gain device), the output of which provides a second oscillator control signal to the oscillator circuit 100.

A further oscillator control signal is provided to the oscillator circuit 100 via CT pin 150 of the IC controller 52. A ramp voltage signal is provided to the CT pin 150 as a result of the charging and discharging of a timing capacitor 152 (FIG. 5) coupled with a supply voltage ultimately coupled to VDD. In the FIG. 5 embodiment, the ramp signal provides a generally linear ramp voltage function. Normally, the ramp function would rise linearly as the timing capacitor 152 charges. The ramp signal is provided to the noninverting inputs of each of the comparators 110 and 111 and the inverting input of the comparator 112. As a result, the comparator 110 provides a high level output when the ramp voltage signal reaches the "high level" voltage (e.g. 2.5 V) of the inverting input of the comparator 110. The comparator 111 provides a high level output when the ramp voltage signal reaches the output level of the error amplifier 101. The comparator 112 provides a high level output when the ramp voltage signal falls below the "low level" voltage (e.g., 200 mV) of the noninverting input of the comparator 112, e.g., following the discharge of the timing capacitor 152 as discussed below.

When either the output of the comparator 110, the output of the comparator 111 or the pulse signal from the synchronous detector circuit 102 is high, the output of NOR gate 114 is low and (provided the output of the oscillator blanking pulse circuit 118 is low) the output of NOR gate 116 is high. This results in the setting of the flip flop 120 and, thus, a high level voltage signal at the output Q of the flip flop 120. The flip flop 120 is reset when the ramp voltage signal at the CT pin 150 falls below the "low level" voltage of the noninverting input of the comparator 112.

A high level voltage signal output of flip flop 120 controls the transistor switch 122 to turn on, resulting in a conduction path between the RD pin 124 and ground. This conduction path to ground causes the timing capacitor 152 (FIG. 5) to discharge and, therefore, brings the ramp voltage signal down. As discussed above, when the ramp voltage level falls below the "low level" of the noninverting input of comparator 112, the flip flop 120 is reset and, therefore, the transistor switch 122 is turned off. As a result, the timing capacitor 152 is again allowed to charge to provide yet another ramp voltage swing of the ramp voltage signal.

In preferred embodiments, the comparators 110, 111 and 112 are high speed with propagation delays of typically 100 nsec. Typical operating frequencies of the IC oscillator may range from 40 KHz to few hundred KHz. The discharge time of the timing capacitor and therefore the pulse width of the clock are preferably in the range of a few hundred nanoseconds to 1 μs.

The clock signal output of the oscillator is provided to two flip flop circuits of the output circuit 108. In particular, the clock signal is provided to the toggle input of a toggle flip flop TFF 154. The "Q" and "Q̄" outputs of the TFF 154 are provided to inputs of logic NOR gate devices, the output of one is passed to pin 66 and the output of the other of is inverted by an invertor circuit and passed to pin 68, to provide the transistor drive signals 55 and 57 (FIG. 6) as discussed above. A clock signal 103 is provided to the inputs of the NOR gates for temporarily forcing both outputs low during a toggling operation, so that both transistors 54 and 56 (FIG. 5) are not momentarily "on" at the same time during a toggling operation.

The current limit and over voltage protection circuit 106 includes a first comparator 160 having a noninverting input coupled to the current limit input pin 88 of the IC controller 52 and an inverting input at a preset voltage level (for example 200 mV). The current limit and over voltage protection circuit 106 also includes a second comparator 162 having a noninverting input coupled to the over voltage protection pin 164 of the IC controller 52 and an inverting input at a preset over voltage level (for example 2.5 V). An embodiment of an over voltage protection circuit is discussed below with reference to FIG. 11.

The output of comparator 160 is high when the voltage at pin 88 is greater than the preset level of the inverting input of the comparator. Similarly, the output of comparator 162 is high when the voltage at pin 164 is greater than the preset level of the inverting input of the comparator. The comparator outputs are coupled to respective inputs of an OR gate 166, such that when the output of either comparator 160 or 162 is high, the output of the OR gate 166 is high and the flip flop circuit 156 is set. As a result, the "Q" output of the flip flop circuit 156 is high and, thus, an input of each NOR gate of the output drive circuit 108 is high, which disables the output drive circuit 108.

In operation, one of the transistors 54 and 56 will be initially turned "on". For example, if transistor 54 is initially turned "on", the supply voltage signal VDD is conducted to LCC resonant circuit of the output network 60. The resonant circuit will provide a resonant current pulse based upon the resonant frequency of the output network. A corresponding voltage signal (83 in FIG. 6) is therefore produced across the resistor 82. The synchronous detect circuit 102 provides an output pulse signal (105 in FIG. 6) having a pulse each time the voltage signal (83 in FIG. 6) falls from a positive peak level to a predetermined level (e.g., +14 mV) or rises from a negative peak level to a predetermined level (e.g., −14 mV). Initially, a pulse of the synchronous detect circuit's output signal (105 in FIG. 6) causes the oscillator circuit 100 to provide a clock signal pulse which results in the toggling of the flip flop 154 in the transistor drive signal output circuit 108. As a result, the transistor drive signal output circuit 108 turns off transistor 54 and turns on the transistor 56.

In this manner, the flip flop 154 controls the toggling of the transistors 54 and 56, wherein the "on" transistor 54 is turned off and the "off" transistor 56 is turned on. Preferably, the toggling occurs in a manner such that both transistors are off for a sufficient period of time to allow the discharging of the parasitic capacitance of the "off" transistor 56 by the current in inductor 76. In particular, toggling of the transistors occurs by turning the "on" transistor 54 off. However, because the transistor 54 was on and conducting current just prior to being turned off, current was flowing in the positive direction (from left to right in FIG. 5) through the inductor 76 just prior to turning the transistor 54 off. When transistor 54 turns off, its parasitic capacitance (represented as capacitor 200 in FIG. 12) begins to charge while the parasitic capacitance of "off" transistor 56 (represented as capacitor 202 in FIG. 12) is fully charged. However, the current in inductor 76 discharges the parasitic capacitance (capacitor 202) of transistor 56 before the transistor 56 is turned on. In this regard, zero voltage is across transistor 56 when it turns on.

While the FET 54 is conducting, the timing capacitor 152 charges and provides a ramp voltage signal to the CT pin 150. The capacitor 152 charges until it reaches a predetermined voltage level (e.g., 2.5 V). In preferred embodiments, the time to charge the timing capacitor to the predetermined voltage level is about 20% more than the one half cycle of the resonant signal of the output network.

As the current in the output network builds up, the voltage across the resistor 95 increases and the output of the error amplifier, therefore decreases. When the error amplifier output falls below the preset voltage level (e.g., 2.5 V), the oscillator is triggered by a signal from comparator 111 to provide a clock pulse and the transistors 54 and 56 are toggled before the time at which the output signal of the synchronous detect circuit would normally trigger the oscillator. The output signal of comparator 111 is also provided to the set "S" input of flip flop 142 which, via the connection of the "Q̄" output of the flip flop 142 with the AND gates 134 and 138, disables the generation of the output pulse signal from the synchronous detect circuit 102. As a result, the operation frequency of the controller driving the resonant circuit of the output network 60 is forced higher than the resonant frequency of the resonant circuit. That is, the sinusoidal cycle of the resonant circuit (and of the voltage signal across resistor 82) is terminated prematurely, resulting in a lower voltage, higher frequency signal to the lamp 50. This reduces the power supplied to the lamp 50. Furthermore, by changing the DIM voltage level at the noninverting input of the error amplifier 101, the operational frequency of the output network can be raised.

The oscillator has three operating modes, namely, (1) an unlocked or free running mode, (2) a locked or synchronized mode and (3) a forced mode in which case oscillator frequency is being determined by the output of the error amplifier. The oscillator begins initial clocking of the circuit so that in the absence of a synchronizing pulse the FET driver outputs are toggling. The oscillator further receives a signal from the output of the error amplifier 101 for dimming functions. This is accomplished simply by changing the trip threshold of one of the comparators. The oscillator synchronizes itself to the synchronous detector output pulses for current synchronous zero voltage switching. It also provides a clock pulse of the proper width to reset flip-flops in the circuit 108 and provide for output pulse blanking so that zero voltage switching resonant transition can take place on external power FETs 54 and 56.

With the value of the timing capacitor 152 assumed to be 100 pF, the timing resistor values can be calculated by the following formulas:

$$\underset{\text{(pulse width of clock 103)}}{tclock} = 106\ nsec + 2.5 \times RD \times CT$$

oscillator frequency f=1/[4×RT×CT+tclock] As an example:
the clock pulse width tclock=206 nsec;
the oscillator frequency f=82 KHz; and
the timing capacitance CT=100 pF $$\underset{\text{(coupled to } RD \text{ input)}}{\text{resistor } RD} = (tclock - 106\ nsec)/(2.5 \times CT) = 400\Omega$$

$$\underset{\substack{\text{resistor } RT \\ \text{(coupled to the } RT \text{ input)}}}{} = 1/(4 \times f \times CT) = 30.5 \text{ K}\Omega$$

The synchronous detector circuit 102 enables resonant current synchronization and, thus, eliminates the need for very precise component tolerancing. Furthermore, it enables the initial ignition of the lamp(s) by forcing the oscillator frequency to the resonant frequency of the output network 60 and thereafter setting the oscillator frequency to an optimum value when operating at full power output (no dimming).

Figure 9:
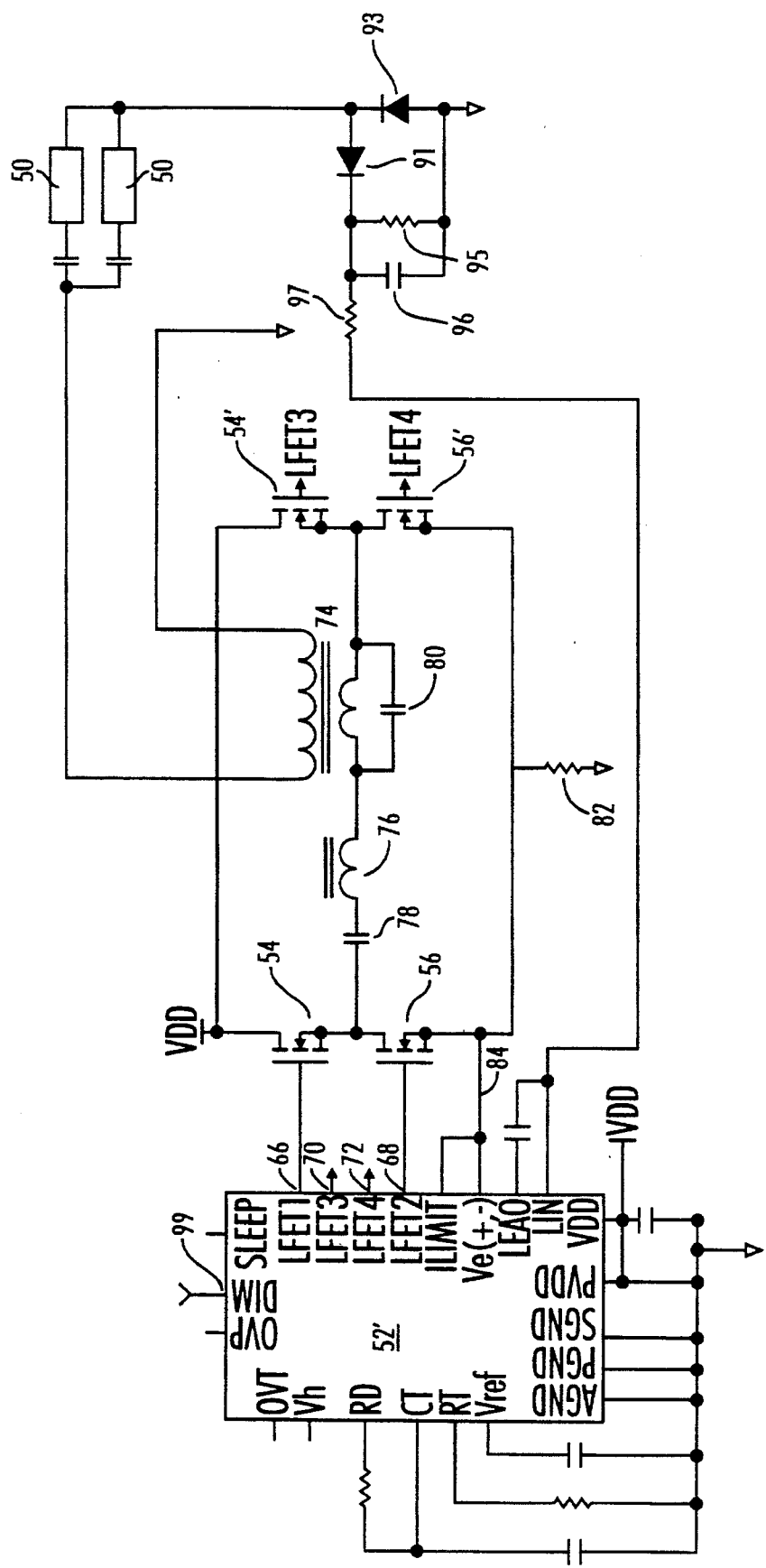
FIG. 9 is a schematic diagram of a power conversion circuit according to another embodiment of the present invention.
Figure 10:
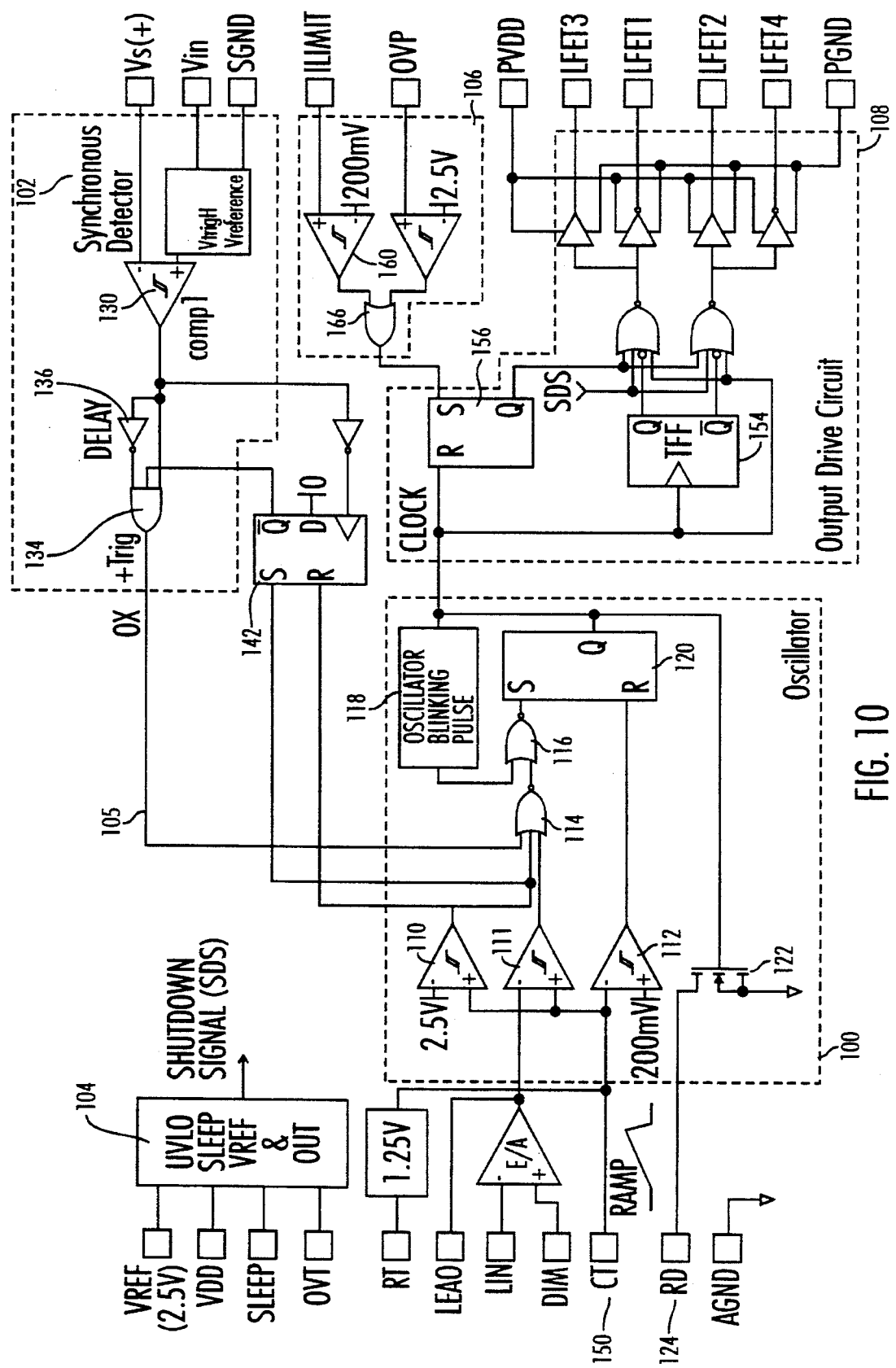
FIG. 10 is schematic circuit diagram of an embodiment of the IC controller shown in FIG. 9.

The embodiment discussed above with reference to FIGS. 5 and 8 employ two transistors 54 and 56 provided in a half bridge configuration. Further embodiments employ four transistors 54, 56, 54' and 56' in a full bridge configuration as shown in FIG. 9. As shown in FIG. 10, the IC controller 52' for such a configuration has four FET driver output pins 66, 68, 70 and 72. In this regard, the output driver circuit 108' is similar to the output driver circuit 108 discussed above, but further includes an additional connection and an additional inverted connection of the outputs of the NOR gates to pins. In addition, the synchronous detect circuit 102' is similar to the synchronous detect circuit 102 discussed above, but includes only one comparator 130.

Figure 11:
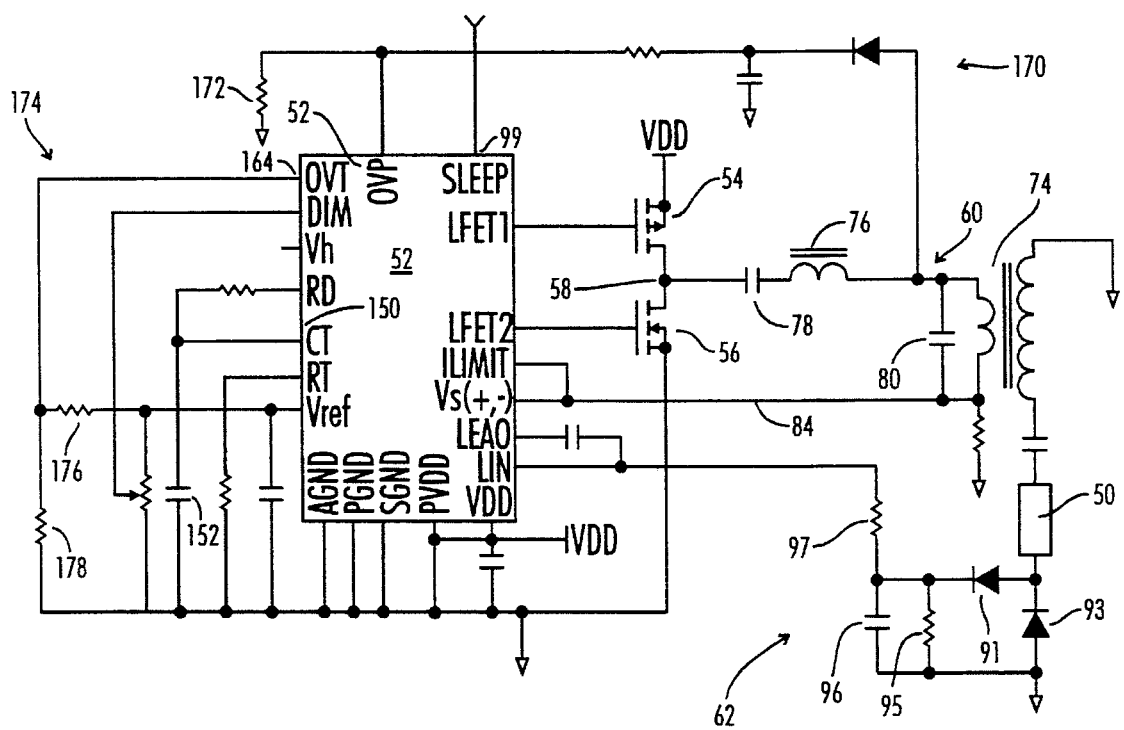
FIG. 11 is a schematic diagram of a power conversion circuit according to yet another embodiment of the present invention.

A further embodiment provided with over temperature and over voltage protection circuits is shown in FIG. 11. The over voltage protection circuit 170 operates to force the FET driver output signals 55 and 57 to zero and, thus, terminate a cycle of the sinusoidal signal of the resonant circuit if the voltage across a resistor 172 exceeds a predetermined value (e.g., 2.5 V). The over temperature protection circuit 174 includes a thermistor 176 which forms a voltage divider with a resister 178. As the temperature increases, the resistance value of thermistor 176 decreases and the voltage across resistor 178 increases. If the voltage across the resistor 178 reaches a redetermined value, the FET driver output signals 55 and 57 are forced to zero and, thus, a cycle of the sinusoidal signal of the resonant circuit is terminated.

Figure 12:
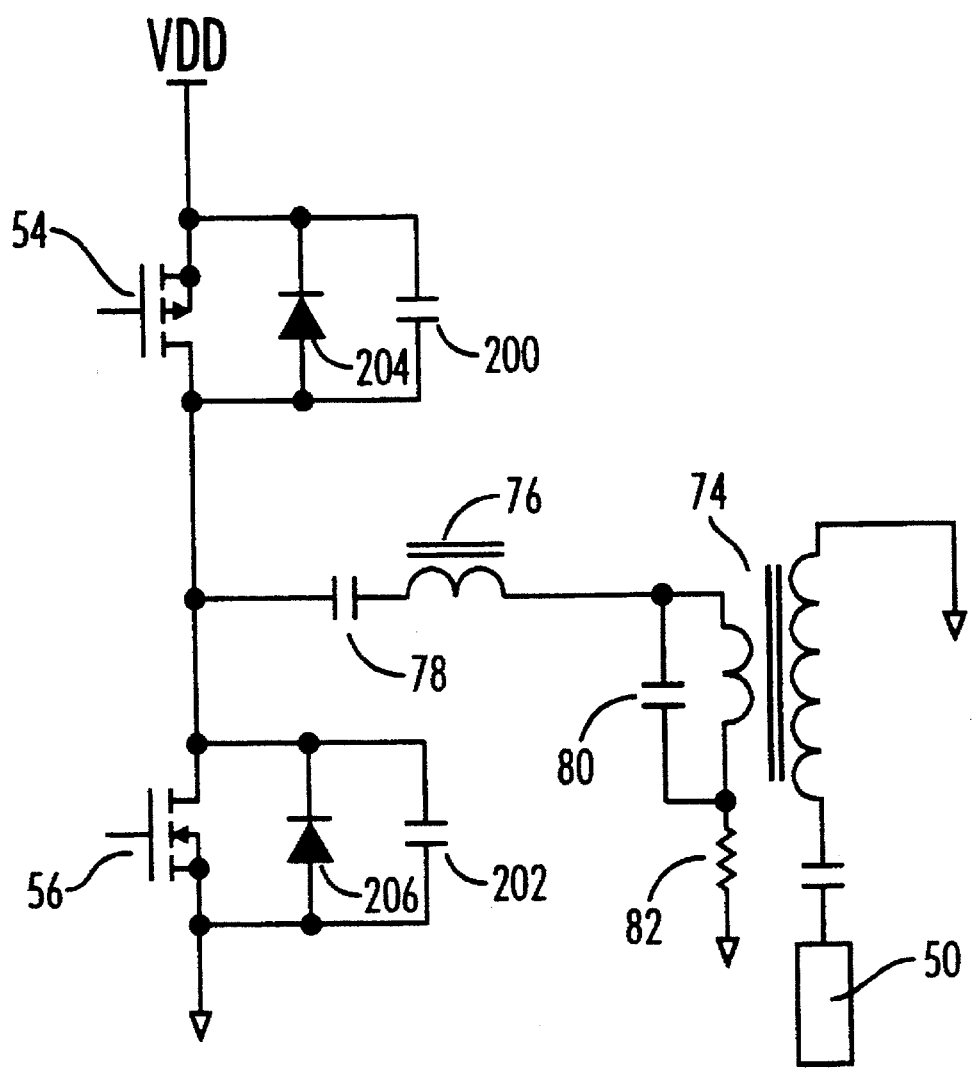
FIG. 12 is a schematic diagram of a portion of the circuit shown in FIG. 5, but showing representations of parasitic components.

The FET and output circuit portion of the above-described systems is shown in FIG. 12. However, FIG. 12 further shows the parasitic components (represented by capacitors 200 and 202 and diodes 204 and 206) of the FETs. These components are utilized as part of the switching circuit to contribute to various advantages mentioned above. In particular, the zero voltage switching (ZVS) action is initiated during the blanking time (internal clock high) of the FET driver outputs, when both transistors 54 and 57 are turned off. The current left in inductor 76 quickly charges the drain-source capacitance (represented by capacitors 92 and 94) of the FETs 54 and 56 to the opposite supply voltage plus 0.7 V. The inductor current must be sufficiently high to fully swing the drain voltage to the maximum input voltage within the blanking time of the FET driver outputs. The required current, $I_{trig(+)}$, can be calculated by using the following equation:

$$I_{trig(+)} = \frac{2(V_{in(max)} + 0.7)C_{ds}}{t_{sb}}$$

Where $t_{sb}$ is the allowed voltage swing time during the blanking of the outputs, $C_{ds}$ is the drain-source capacitance and $V_{in(max)}$ is the maximum input voltage.

Figure 13:
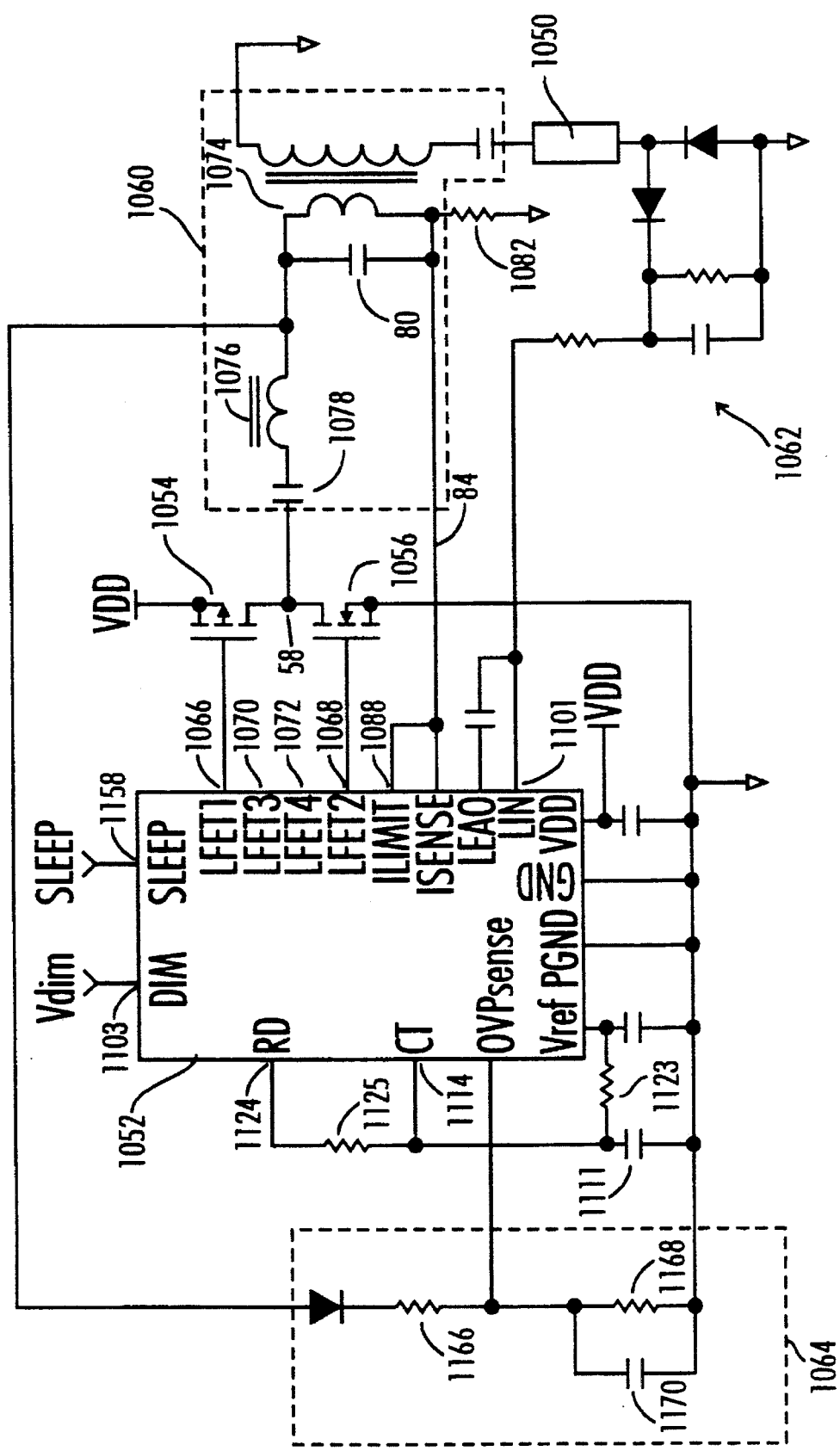
FIG. 13 is a schematic diagram of a power conversion circuit according to yet another embodiment of the present invention.
Figure 15:
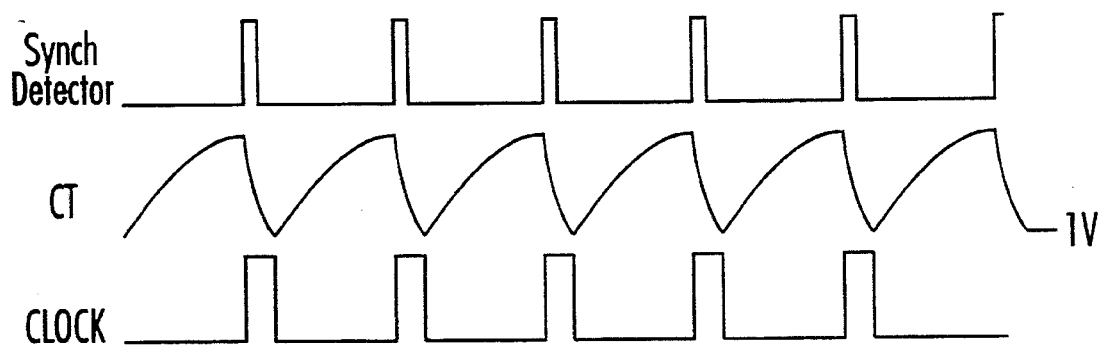
Figure 16:
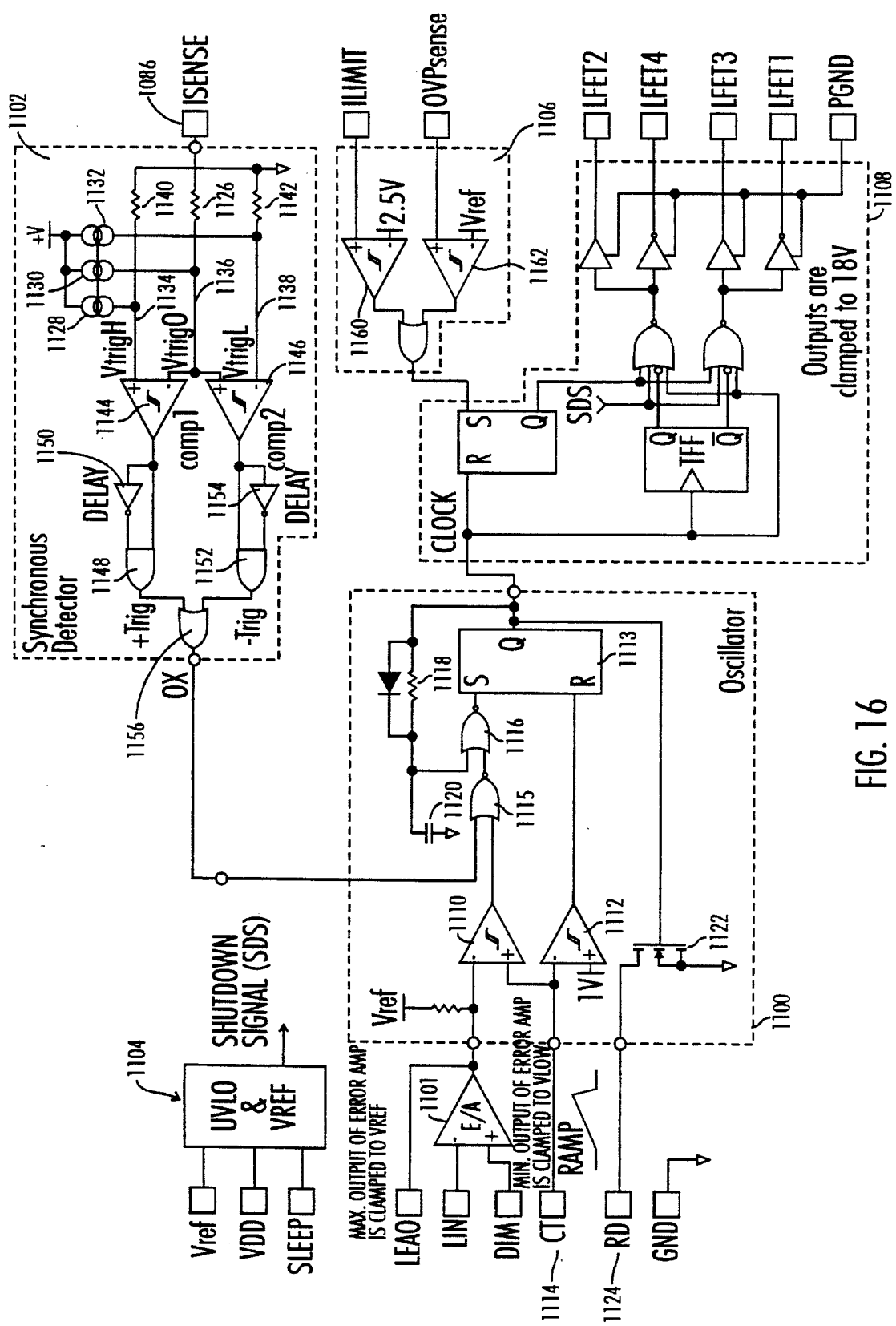
FIG. 16 is schematic circuit diagram of an embodiment of the IC controller shown in FIG. 13.

Further features of the above-described embodiment as well as additional features of other embodiments are discussed as follows with reference to FIGS. 13–16. FIG. 13 shows a schematic diagram of a further embodiment of a lamp control circuit. FIG. 16 shows a schematic circuit diagram of the IC controller 1052 shown in FIG. 13.

The shown with reference to FIGS. 13 and 16 employ two transistors 1054 and 1056 provided in a half bridge configuration. Further embodiments employ four transistors in a full bridge configuration as discussed above.

The controller 1052 includes an oscillator 1100 having features similar to those discussed above with respect to oscillator 1100, but which further includes a feedback circuit (comprising a diode 1117, resistor 1118 and capacitor 1120) coupled between the Q terminal of flip-flop 1113 and one input Of the NOR gate 1116. The feedback circuit functions to eliminate multi-pulse retriggering of the oscillator by disabling sensing when the clock pulse is high.

For accurate control of the discharge time the drain of a discharge transistor 1122 is coupled to an external pin of the IC controller, via pin RD (1124 in FIG. 13). This enables setting the blanking time depending on various power circuits and operating frequencies, it also tightens the tolerance of the oscillator frequency.

Similar to the oscillator 100 discussed above, the oscillator 1100 has three operating modes, namely, (1) an unlocked or free running mode, (2) a locked or synchronized mode and (3) a forced mode in which case oscillator frequency is being determined by the output of the error amplifier.

Figure 14:
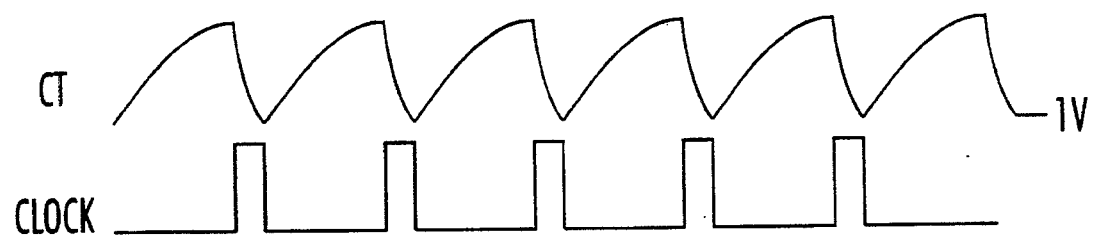
FIGS. 14 and 15 are timing and waveform diagrams of various signals of the FIG. 13 embodiment.

FIG. 14 shows various voltages and waveforms of the oscillator when operating in a forced mode or dim condition (the output of the error amplifier controls the frequency of oscillation). FIG. 15 shows various voltages and waveforms of the oscillator when operating in the locked mode, wherein the frequency of operation of the oscillator is determined by the synchronous detect. The synchronization pulse is applied to sync pulse input 1117 of the oscillator. The width of this pulse is smaller than the discharge time of the timing capacitor for proper operation. The design equations for the oscillator are determined by the free running frequency which in turn is roughly 20% lower than the expected locked frequency.

$$R_{123} = \frac{t_{on}}{C_{111}\ln[(V_{ref}-1)/(V_{ref}-2.5)]}$$

$$R_{125} = \frac{t_{on}}{0.916\, C_{111}}$$

The value of the timing capacitor 1111 can be assumed to be about 1000 pF.

The oscillator begins initial clocking of the circuit so that in the absence of a synchronizing pulse the FET driver outputs are toggling. The oscillator further receives a signal from the output of the error amplifier 1101 for dimming functions. This is accomplished simply by changing the trip threshold of one of the comparators. The oscillator synchronizes itself to the synchronous detector output pulses for current synchronous zero voltage switching. It also provides a clock pulse of the proper width to reset flip-flops in the circuit 1108 and provide for output pulse blanking so that zero voltage switching resonant transition can take place on external power FETs 1054 and 1056.

The synchronous detector circuit 1102 receives a current signal from output network 1060 through the current sense input pin ISENSE (1086 in FIG. 13) and generates a trigger pulse output for synchronization of the oscillator circuit 1100. The current signal from the output network 1060 is converted to a voltage signal across a resistor 1126. The circuit 1102 includes three tracking current sources 1128, 1130 and 1132 coupled to conductors 1134, 1136 and 1138, respectively. Conductor 1136 is coupled through the resistor 1126 to the ISENSE pin 1086. A resistor 1140 is coupled to the conductor 1134, between the current source 1128 coupling and ground, and a resistor 1142 is coupled to conductor 1138, between the current source 1132 and ground.

A pair of comparators 1144 and 1146 are coupled with the noninverting input of comparator 1146 and the inverting input of comparator 1144 coupled to the conductor 1136. The noninverting input of comparator 1144 is coupled to conductor 1134, and the inverting input of comparator 1146 is coupled to conductor 1138. The output of comparator 1144 is coupled directly to one input of an AND gate 1148 and is coupled through a delay element 1150 to the other input of the AND gate 1148. Similarly, the output of comparator 1146 is coupled directly to one input of an AND gate 1152 and is coupled through a delay element 1154 to the other input of the AND gate 1152. The outputs of the AND gates 1148 and 1152 are coupled to the input terminals of an OR gate 1156, the output of which is coupled to the sync pulse input 1117 of the oscillator circuit 1100.

The synchronous detector circuit 1102 enables resonant current synchronization and, thus eliminates the need for very precise component tolerancing. Furthermore, it enables the initial ignition of the lamp(s) by forcing the oscillator frequency to the resonant frequency of the output network 1060 and thereafter setting the oscillator frequency to an optimum value when operating at full power output (no dimming).

The three tracking current sources 1128, 1130 and 1132 provide level shifting for the sensed output network current, which is converted to a voltage across resistor 1126. This voltage is quasi-sinewave and at steady state is symmetrical around zero volts with equal positive and negative peaks. The level shifting is done to enable sensing the ltrig(+) and ltrig(−) points of the current waveform (wherein ltrig(+) and ltrig(−) correspond to the +Trig voltage level divided by the value of resistor 1082 and the −Trig voltage level divided by the value of resistor 1082, respectively). The level shift can be set to any reasonable value such as 2.5V. The input voltage can be level shifted to a value that may enhance comparator accuracy. Preferably, the peak to peak swing of the input waveform is less than 100 mV and sensing will take place in a fraction of this value. As a result, the comparators should have input offset voltage requirements in the 1 mV range.

Furthermore, it is preferred that the propagation delays from the sensed input to the output be minimal. The level to slope/edge conversion circuitry (AND gate INVERTOR combination) should be designed such that the trigger pulse generated at the output is the minimum necessary to satisfy synchronization of the oscillator.

The resistor 1126 connected in the signal path, as well as parasitic capacitances, will introduce some phase delays in the sensing circuitry. Attention must be paid to this point so that resulting delays are not excessive to the point at which they will detune resonant timing.

The under voltage lockout circuit 1104 enables the "crisp turn-on/turn-off" of the circuit without any in-between, undetermined states that may cause the destruction of the circuit. Preferably, all circuits are fully functional at the IC start voltage.

The reference $V_{ref}$ is a low current, 1% reference. The external current drive requirement for the reference is very low, in the order of 1 mA maximum comprised primarily of the timing capacitor 1111 charging current.

Sleep control is accomplished through an external pin (the SLEEP pin 1158 in FIG. 13). A TTL level input function controls the timing at which the IC controller 1052 enters a very low current mode, regardless of input voltage or other conditions. The current drain of the IC controller 1052 drops to below 1 µA while pin 1158 is kept low.

In the current limit and over voltage protection (OVP) circuit 1106, current limiting is provided by a current limit comparator 1160. The circuit 1106 provides only destructive current protection. The current signal is normally sinewave with a rather large inductance in its path. This eases the requirements on the comparator somewhat. A typical propagation delay of 200 ns should provide sufficient protection. The sense threshold on this comparator is also DC shifted in order to provide easy sensing and enable the use of NPN input transistors. Furthermore, the peaking of the output voltage under unloaded resonant conditions is kept under check with this comparator. This is accomplished by simply limiting the current build-up under unloaded conditions.

If comparator 1160 fails, comparator 1162 is activated. Comparator 1162 has a rather large hysteresis of 2 V. This provides a safe discharge time for system high voltages before a new attempt at turn-on is made. Resistors 1166 and 1168 and capacitor 1170 of the OVP circuit (FIG. 13) provide the sense delays and time-out functions.

The steering logic and output driver circuit 1108 of the IC controller 1052 has four output drivers to accommodate both half and full bridge power circuit configurations. The system will normally be used in the half bridge configuration. However, full bridge (four power transistors) configurations may be employed, e.g., for higher power applications. The drive capability of the drivers is somewhat eased due to the zero voltage switching feature (wherein drain-gate capacitance feedback is almost eliminated).

Typical loads may be, for example, FETs that have an equivalent input capacitance of less than 1000 pF. Required peak currents may be less than 500 mA with a 12 V supply voltage.

Figure 17:
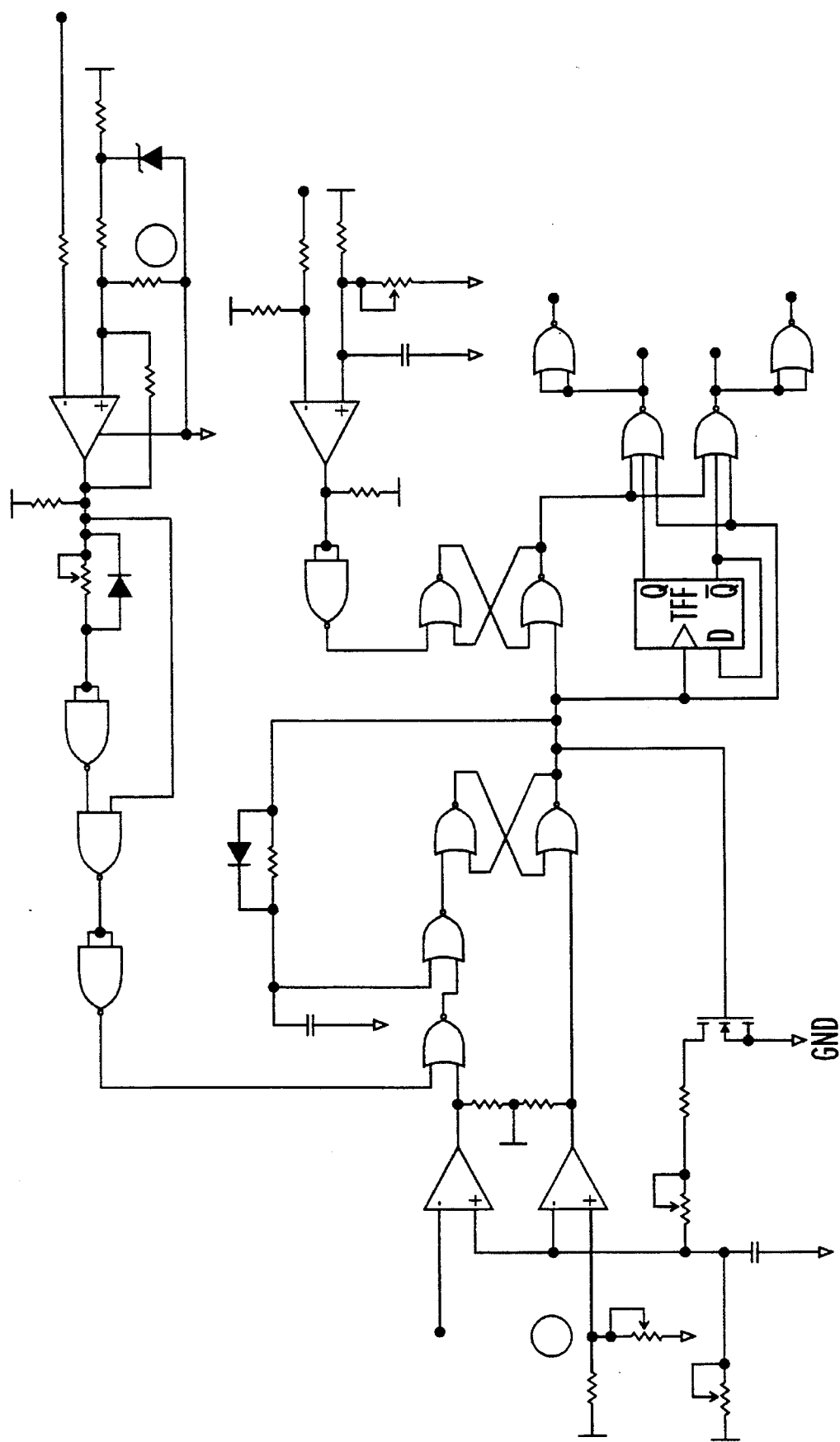
FIG. 17 is a schematic diagram of another controller according to an embodiment of the present invention.

The above described power converter circuits, thus, can provide low conversion losses, low generated noise and output power controllability. The output network 60 provides impedance matching and operating point stabilization functions. The output network 60 also enables zero voltage switching, thus reducing radiated noise and minimizing (and possibly eliminating almost completely) switching losses. The system is capable of self synchronizing to the resonant frequency of the matching components including the load. Dimming of the lamp is accomplished simply by desynchronizing and increasing the oscillator frequency. Thus, the control architecture allows the use of external parts of lower precision and cost while providing dimming capability in a single stage. In preferred embodiments, the controller 52 or 1052 is implemented in a convenient IC package. However, it will be recognized that principles of the invention may be implemented in other forms. For example, FIG. 17 shows an implementation of a control circuitry, using discrete circuit elements.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A power converter for converting an input power signal to an output power signal, said power converter comprising:

a controller having an oscillator circuit, a synchronous detector and a plurality of control signal outputs for providing transistor control signals dependent upon the oscillator frequency;

a plurality of transistors coupled to receive said input power signal and provide a square wave voltage signal, each transistor being associated with one of said control signal outputs and having a control input coupled to receive a control signal from the associated control signal output of said controller;

a resonant circuit controlled by said square wave voltage signal from said plurality of transistors to produce a resonant current and provide a high frequency sine wave output voltage signal;

wherein said synchronous detector includes a circuit coupled to detect the resonant frequency of the resonant circuit and to provide an oscillator control signal to control the frequency of the oscillator circuit dependent upon the resonant frequency of the resonant circuit.

2. A power converter as recited in claim 1, wherein said plurality of transistors comprises a P-channel FET and an N-channel FET, each having a source, a drain and a gate, the source of the P-channel FET being coupled to receive said input power signal, the source of the N-channel FET being coupled to ground, the drains of the P-channel and N-channel FETs being coupled together and to the resonant circuit.

3. A power converter as recited in claim 1, wherein said plurality of transistors comprises first and second P-channel FET and first and second N-channel FET, each having a source, a drain and a gate, the source of each of the first and second P-channel FETs being coupled to receive said input power signal, the source of each of the N-channel FETs being coupled to ground, the drains of the first P-channel and first N-channel FETs being coupled together and to the resonant circuit, and the drains of the second P-channel and second N-channel FETs being coupled together and to the resonant circuit.

4. A power converter as recited in claim 1, wherein said resonant circuit comprises an LCC circuit having an inductor, and two capacitors coupled to provide a resonant current.

5. A power converter as recited in claim 1, wherein the transistors are controlled to switch under near zero voltage switching turn-on conditions.

6. A power converter as recited in claim 1, wherein said synchronous detect circuit includes:

first, second and third current sources coupled to one side of first, second and third resistors, respectively, for level shifting;

a current sense input coupled to the resonant circuit to receive a resonant current signal;

a first comparator having a noninverting input coupled to the first current source side of the first resistor and an inverting input coupled to the current sense input and the second current source side of the second resistor;

a second comparator having a noninverting input coupled to the current sense input and the second current source side of the second resistor and an inverting input coupled to the third current source side of the third resistor.

7. A power converter as recited in claim 1, further comprising a resistor coupled to sample the resonant current produced by the resonant circuit and to provide a voltage waveform thereacross dependent upon the resonant current, wherein the voltage waveform periodically crosses the zero voltage level, and wherein said controller includes control circuit means responsive to the zero voltage crossing of the voltage waveform, for providing the transistor control signals to turn on the transistors when the voltage waveform is near the zero voltage level.

8. A power supply device as recited in claim 1, wherein said resonant circuit further includes a transformer having a primary winding coupled to receive said resonant current and a secondary winding for providing said sine wave output power signal.

9. A controller for a power converter operable with a resonant circuit having a resonant frequency, for converting an input power signal to an output power signal, said controller comprising:

an oscillator circuit having a controllable oscillation frequency and adapted to be coupled to control the operating frequency of the resonant circuit;

a synchronous detect circuit coupled to detect the resonant frequency of the resonant circuit and to provide an oscillator control signal to control the oscillation frequency of the oscillator circuit dependent upon the resonant frequency of the resonant circuit.

10. A controller as recited in claim 9, wherein said resonant circuit comprises an LCC circuit having an inductor, and two capacitors coupled to provide a resonant current.

11. A controller as recited in claim 9, wherein said synchronous detect circuit includes:

first, second and third current sources coupled to one side of first, second and third resistors, respectively, for level shifting;

a current sense input adapted to be coupled to the resonant circuit to receive a resonant current signal;

a first comparator having a noninverting input coupled to the first current source side of the first resistor and an inverting input coupled to the current sense input and the second current source side of the second resistor;

a second comparator having a noninverting input coupled to the current sense input and the second current source side of the second resistor and an inverting input coupled to the third current source side of the third resistor.

12. A method of converting an input power signal to an output power signal with a resonant circuit and a control circuit for controlling the operating frequency of the resonant circuit, said power converter method comprising:

sensing the resonant frequency of the resonant circuit;

controlling the oscillation frequency of an oscillator dependent upon the resonant frequency of the resonant circuit; and controlling the operating frequency of the resonant circuit dependent upon the oscillation frequency of the oscillator.

13. A method as recited in claim 12, wherein the resonant frequency of the resonant circuit is controlled by the on and off states of first and second transistors, wherein said step of controlling the resonant frequency comprises the step of controlling the on and off states of the first and second transistors dependent upon the oscillation frequency of the oscillator.

14. A method as recited in claim 13, wherein the step of controlling the on and off states of the first and second transistors comprises controlling the transistors to switch under near zero voltage switching turn-on conditions.

15. A method as recited in claim 12, further comprising the step of varying the level of the output power signal by varying the oscillation frequency of the oscillator.

16. A fluorescent lamp system comprising:

a controller having an oscillator circuit, a synchronous detect circuit and a plurality of control signal outputs for providing transistor control signals dependent upon the oscillator frequency;

a plurality of transistors coupled to receive said input power signal and provide a square wave voltage signal, each transistor being associated with one of said control signal outputs and having a control input coupled to receive a control signal from the associated control signal output of said controller;

a resonant circuit controlled by said square wave voltage signal from said plurality of transistors to produce a resonant current and provide a high frequency sine wave output voltage signal;

at least one fluorescent lamp coupled to receive said high frequency sine wave output voltage signal;

wherein said synchronous detect circuit includes a frequency detector coupled to detect the resonant frequency of the resonant circuit and to provide an oscillator control signal to control the frequency of the oscillator circuit dependent upon the resonant frequency of the resonant circuit.

17. A system as recited in claim 16, wherein said at least one fluorescent lamp comprises at least one cold cathode fluorescent lamp.

18. A fluorescent lamp system comprising:

a resonant circuit having a resonant frequency and controlled to produce a resonant current signal and provide a high frequency sine wave output voltage signal; and a controller having an oscillator circuit and a synchronous detect circuit, wherein:

the oscillator circuit has a controllable oscillation frequency and adapted to be coupled to control the operating frequency of the resonant circuit; and the synchronous detect circuit is coupled to detect the resonant frequency of the resonant circuit and to provide an oscillator control signal to control the oscillation frequency of the oscillator circuit dependent upon the resonant frequency of the resonant circuit.

19. A system as recited in claim 18, wherein said resonant circuit comprises an LCC circuit having an inductor, and two capacitors coupled to provide a resonant signal.

20. A system as recited in claim 18, wherein said synchronous detect circuit includes:

first, second and third current sources coupled to one side of first, second and third resistors, respectively, for level shifting;

a current sense input adapted to be coupled to the resonant circuit to receive a resonant current signal;

a first comparator having a noninverting input coupled to the first current source side of the first resistor and an inverting input coupled to the current sense input and the second current source side of the second resistor;

a second comparator having a noninverting input coupled to the current sense input and the second current source side of the second resistor and an inverting input coupled to the third current source side of the third resistor.

21. A system as recited in claim 18, wherein the controller further comprises a plurality of control signal outputs for providing transistor control signals dependent upon the oscillator frequency; and wherein the system further comprises:

a plurality of transistors coupled to receive an input power signal and provide a square wave voltage signal, each transistor being associated with one of said control signal outputs and having a control input coupled to receive a control signal from the associated control signal output of said controller;

wherein the resonant circuit is controlled by said square wave voltage signal from said plurality of transistors to provide a resonant current and a high frequency sine wave output voltage signal.

22. A power converter as recited in claim 21, wherein said plurality of transistors comprises a P-channel FET and an N-channel FET, each having a source, a drain and a gate, the source of the P-channel FET being coupled to receive said input power signal, the source of the N-channel FET being coupled to ground, the drains of the P-channel and N-channel FETs being coupled together and to the resonant circuit.

23. A power supply device for providing an output sine wave power signal, said power supply device comprising:

a controller having an oscillator circuit, a synchronous detector and a plurality of control signal outputs for providing transistor control signals dependent upon the oscillator frequency;

a plurality of transistors coupled to receive an input power signal, each transistor being associated with one of said control signal outputs and having a control input coupled to receive a control signal from the associated control signal output of said controller, the control signals controlling the transistors to turn on at a frequency dependent upon the oscillator frequency to provide a square wave voltage signal;

an output network including a resonant circuit controlled by said square wave voltage signal from said plurality of transistors for producing a resonant current and providing a sine wave output power signal;

wherein said synchronous detector includes a circuit coupled to detect the resonant frequency of the resonant circuit and to provide an oscillator control signal to control the frequency of the oscillator circuit dependent upon the resonant frequency of the resonant circuit.

24. A power supply device as recited in claim 23, wherein said output network further including a transformer having a primary winding coupled to the resonant circuit and a secondary winding for providing said sine wave output power signal.

25. A power converter as recited in claim 23, further comprising a resistor coupled to sample the resonant current produced by the resonant circuit and to provide a voltage waveform there across dependent upon the resonant current, wherein the voltage waveform periodically crosses the zero voltage level, and wherein said controller includes control circuit means responsive to the zero voltage crossing of the voltage waveform, for providing the transistor control signals to turn on the transistors when the voltage waveform is near the zero voltage level.

* * * * *